Oct. 18, 1938. J. F. KOPSA Re. 20,885
LIQUID SEPARATING DEVICE
Original Filed July 10, 1933 2 Sheets-Sheet 1
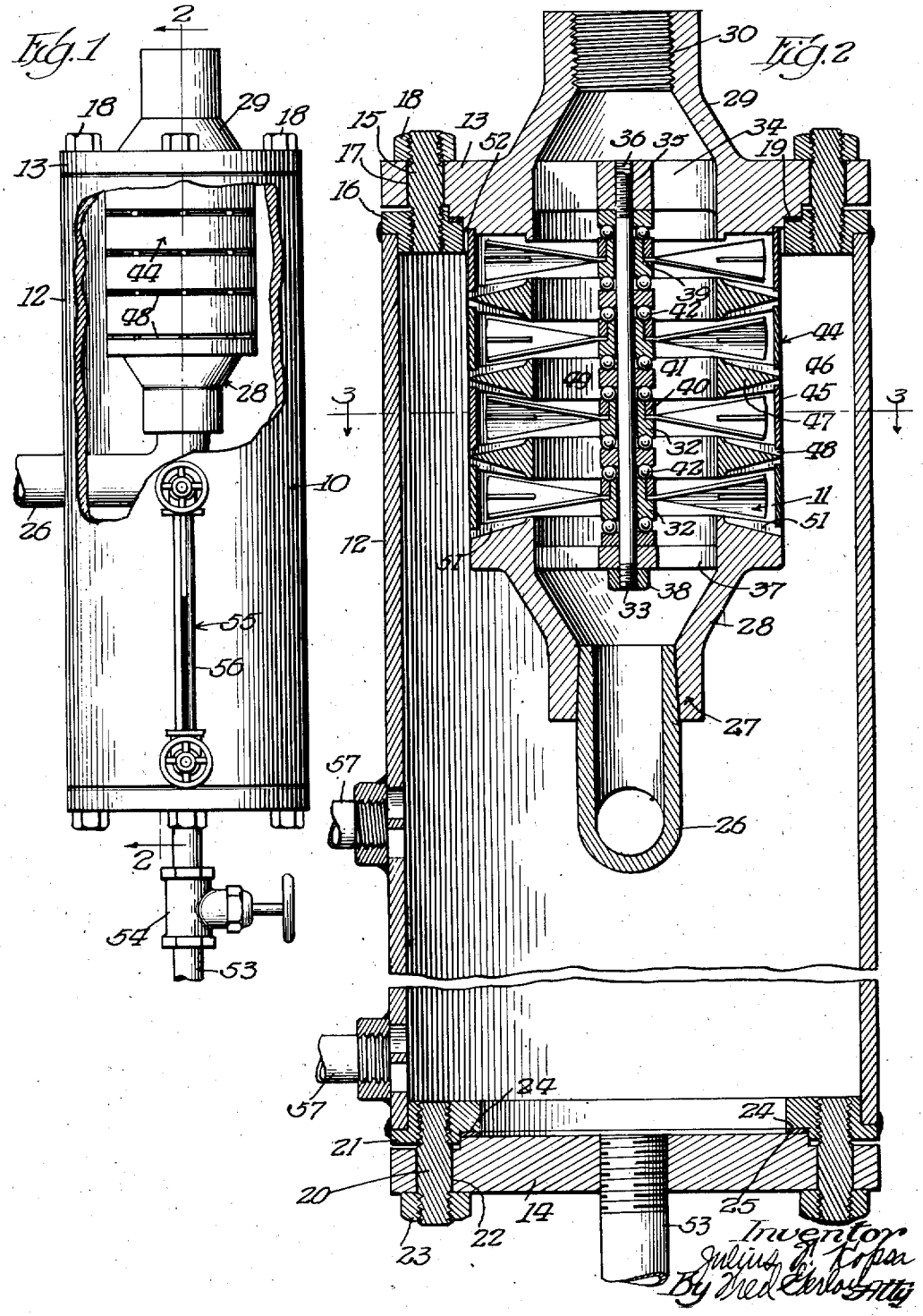

Oct. 18, 1938. J. F. KOPSA Re. 20,885

LIQUID SEPARATING DEVICE

Original Filed July 10, 1933 2 Sheets-Sheet 2

Inventor
Julius F. Kopsa
By McKerlan Atty

Reissued Oct. 18, 1938

Re. 20,885

UNITED STATES PATENT OFFICE 20,885

LIQUID SEPARATING DEVICE

Julius F. Kopsa, Chicago, Ill., assignor to Kopolator Corporation, Chicago, Ill., a corporation of Illinois Original No. 2,006,244, dated June 25, 1935, Serial No. 679,674, July 10, 1933. Application for reissue June 24, 1937, Serial No. 150,210

19 Claims. (Cl. 183—77)

The present invention relates generally to devices for separating or disuniting liquid in suspension from gas under pressure. More particularly, the invention relates to that type of liquid-separating device which comprises (1) an elongated, vertically extending casing having inlet and outlet nipples whereby the gas from which the liquid is to be separated or disunited is introduced and permitted to flow vertically through the casing; and (2) a plurality of circular deflectors which are mounted in the casing between the inlet and outlet nipples to rotate on a vertical axis and have radially extending blades whereby they are caused to rotate in response to flow of the gas through the casing and the liquid in suspension is thrown outwardly and removed from the gas by centrifugal force.

One object of the invention is to provide a device of this type which is generally an improvement upon and is more efficient in operation than previously designed devices for the same purpose, consists of but a small number of parts and may be manufactured at a low and reasonable cost.

Another object of the invention is to provide a liquid-separating device of the type under consideration in which the inlet nipple for introducing the gas into the casing extends through the central portion of the side wall of the casing and the outlet nipple is located at the top of the casing so that the gas flows upwardly through the upper portion of the casing and the lower portion of the casing forms a tank or reservoir for the liquid which is separated or disunited from the gas as the latter flows upwardly to the outlet nipple and is subjected to the action of the rotatable, blade-equipped deflectors.

Another object of the invention is to provide a liquid-separating device of the last mentioned character in which the upper end of the casing is closed by means of a removable plate and the blade-equipped deflectors are rotatably mounted on a shaft which is connected to and depends from this plate so that they are removable as a unit from their operative position for inspection or repair purposes when the plate is removed from the casing.

A further object of the invention is to provide a liquid-separating device of the last mentioned character in which the deflectors are surrounded by a cylindrical shell which is of less diameter than, and is positioned centrally in the upper end of, the casing and consists of a plurality of rings which are positioned one above the other and are spaced apart to provide openings through which the liquid thrown outwardly by the deflectors may pass.

A still further object of the invention is to provide a liquid-separating device of the type and character under consideration in which the rings which form the cylindrical shell around the blade-equipped deflectors are spaced apart by means of washer-shaped elements which encircle the shaft depending from the removable plate at the upper end of the casing and have the top and bottom faces thereof shaped and arranged to guide the liquid from the blades on the deflectors to the openings between the rings.

Additionally, it is contemplated as one of the objects of the invention to provide a device for separating liquid in suspension from gas under pressure in which the various parts thereof are arranged compactly and in a novel manner.

Other objects of the invention and the various advantages and characteristics of the present liquid-separating device will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side view of a liquid-separating device embodying the invention, parts of the casing of the device being broken away and shown in section for purposes of illustration;

Figure 2 is an enlarged vertical section illustrating in detail the arrangement of the blade-equipped deflectors and the construction of the casing;

Figure 3:
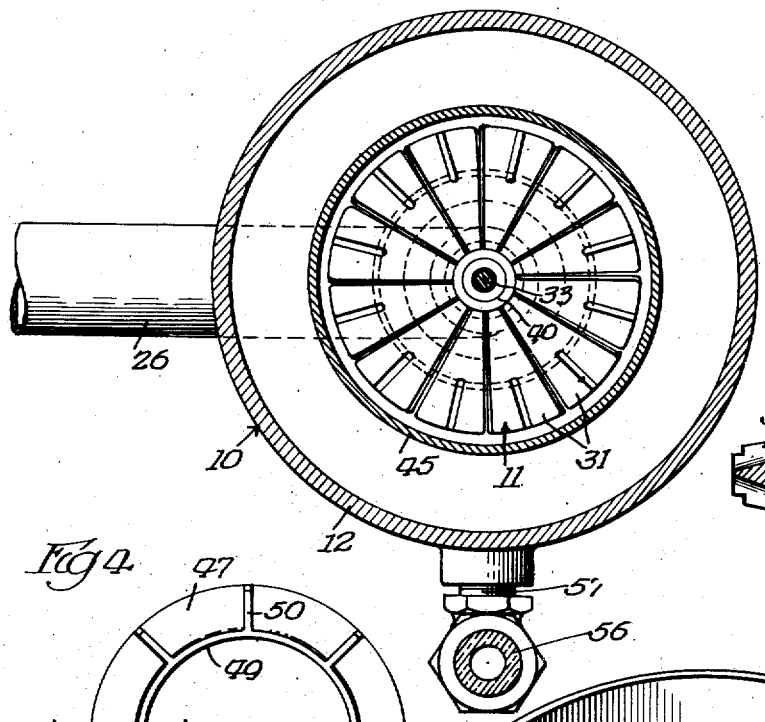
Figure 3 is a horizontal section on the line 3—3 of Figure 2.
Figure 6:
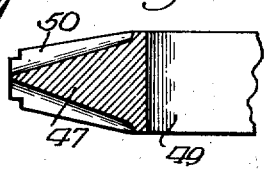
Figure 6 is an enlarged vertical section on the line 6—6 of Figure 4.
Figure 4:
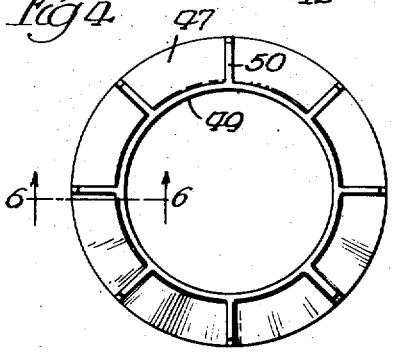
Figure 4 is a top view of one of the washer-shaped elements which serve to space apart the rings of the shell and guide the liquid to the openings between the rings.
Figure 7:
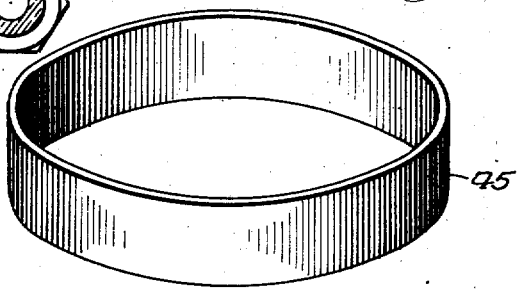
Figure 7 is a perspective of one of the rings which forms the shell around the deflector.
Figure 5:
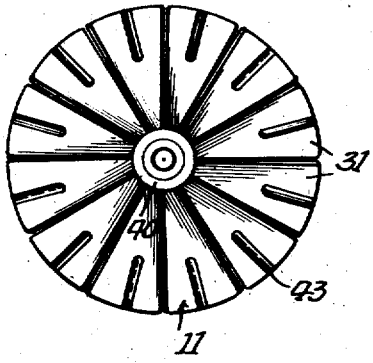
Figure 5 is a top view of one of the deflectors disclosing the construction and arrangement of the radially extending blades.
Figure 8:
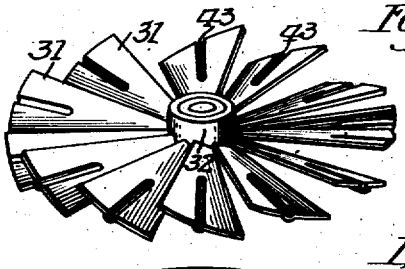
Figure 8 is a perspective of one of the deflectors.
Figure 9:
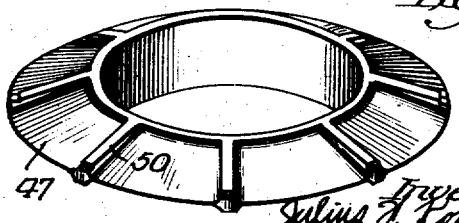
Figure 9 is a perspective of one of the washer-shaped elements which serve as spacers for the rings.

The device which forms the subject matter of the invention is adapted to separate or disunite liquid in suspension from a gas under pressure. It is in the form of a unitary structure and comprises an elongated, vertically extending casing 10 and a vertical series of rotatable deflectors 11. The casing surrounds the deflectors and consists of a cylindrical side wall 12, a circular top plate 13 and a circular bottom plate 14. The top plate 13 serves to close the upper end of the cylindrical side wall 12 of the casing and is removably secured in place by means of an annular series of studs 15. The latter are connected to and extend upwardly from a ring 16 and project through holes 17 in the margin of the top plate 13. Nuts 18 on the upper ends of the studs hold the top plate 13 in clamped relation with the ring 16. This ring as shown in Figure 2 of the drawings, is welded to and extends inwardly from the upper end of the cylindrical side wall 12 of the casing 10. An annular gasket 19 fits between opposed shoulders on the top plate 13 and the ring 16 and forms a seal for preventing leakage between said plate and ring. The bottom plate 14 serves as a closure for the lower end of the side wall of the casing 10 and is removably secured in place by an annular series of studs 20. The latter are secured to and extend downwardly from a ring 21 and project through circular holes 22 in the margin of the bottom head 14. Nuts 23 on the lower ends of the studs clamp the head 14 against the ring 21. When the nuts are removed from the studs 22, the bottom head 14 may be removed to provide access to the lower end of the casing. The ring 21 extends inwardly from and is welded to the lower end of the side wall 12 of the casing and embodies a seat 24 for an annular gasket 25. The latter, as shown in Figure 2 of the drawings, fits against the top face of the bottom plate 14 and forms a seal whereby leakage is prevented between the bottom plate and the ring 21. The cylindrical side wall 12 of the casing is preferably formed from a length of steel tubing.

The gas from which the liquid in suspension is to be separated or disunited is introduced into the casing 10 by way of an inlet nipple 26. This nipple extends through a circular hole in the central portion of the side wall 12 of the casing and is welded to the side wall so that it is permanently connected thereto. The inner end of the nipple 26 is bent upwardly as shown in Figure 1 and fits slidably in and discharges into a tubular bottom extension 27 on a hollow cast metal head 28. The central portion of the top plate 13 which forms a closure for the upper end of the casing 10 is shaped to form an upwardly extending outlet nipple 29. This nipple is provided with an internal or female screw thread 30 whereby it may be connected to a pipe or like element. The gas which enters the casing via the inlet nipple 26 flows upwardly into the hollow head 28 and then after being subjected to the action of the deflectors 14, as hereinafter described, flows out of the casing by way of the outlet nipple 29.

The deflectors 11 are formed of disks of sheet metal and are slit radially and bent or twisted so that they embody radially extending, angularly disposed blades 31. They embody in addition to the blades 31, hubs 32 and are mounted for horizontal rotation on a vertically extending shaft 33. The latter is longitudinally aligned with the inlet and outlet nipples 26 and 29 and is secured to and depends from a crossbar 34. The latter, as shown in Figure 2, is formed integrally with the top plate 13 for closing the upper end of the casing 10 and extends diametrically across the lower end of the outlet nipple 29. The upper end of the shaft 33 fits within and is connected by a screw thread connection 35 to a vertical bore 36 in the central portion of the crossbar 34. The lower end of the shaft 33 extends through a crossbar 37 in the upper end of the head 28 and is provided with a nut 38 which underlies the crossbar and serves together with the shaft to support the hollow head 28 from the top plate 13. The hubs 32 of the deflectors 11 fit loosely around the shaft 33 and are cut away at the upper ends thereof so as to form flat, annular shoulders 39. The sheet metal disks from which the deflectors are formed are centrally apertured so as to fit around the reduced portions of the hubs and fit against the shoulders 39. Ferrules 40 are pressed around the reduced upper end portions of the hubs and serve to clamp the deflectors in place against the shoulders and in locked relation with the hubs. The deflectors 11 are spaced apart by means of collars 41 which are shrunk or otherwise fixedly secured to the shaft 33. An annular series of balls 42 are disposed between the collars and the hubs 32 and form anti-friction bearings whereby the deflectors are free to revolve around the shaft 33. The gas from which any liquid in suspension is to be separated or disunited, strikes against the deflectors 11 as it flows upwardly in the casing between the head 28 and the outlet nipple 29 and because of the angularity and shape of the blades 31 causes the deflectors to rotate. This rotation of the deflectors results in any liquid in suspension in the gas being thrown outwardly as the result of centrifugal action. In order to increase the efficiency of the deflectors, the central portions of the blades 31 are centrally deflected or shaped to form radially extending ribs 43. The latter operate in a measure as baffles and guide the liquid separated from the gas outwardly. The deflectors ars preferably four in number. The blades of the bottom deflector and the one third from the bottom are twisted so that these two deflectors rotate in one direction. The blades of the deflector second from the bottom and the one opposite the top cover of the casing are oppositely twisted so that these two deflectors rotate in the opposite direction. As a result of this construction, the gas is subjected to the action of deflectors, some of which rotate in one direction and others of which operate in the opposite direction, with the result that any and all liquid in suspension in the gas is effectively separated or disunited from the gas prior to passage of the gas into the outlet nipple.

For the purpose of guiding the gas from the inlet nipple 26 to the outlet nipple, a cylindrical shell 44 is provided. This shell surrounds the deflectors 11, consists of a plurality of superposed rings 45 and is of smaller diameter than the side wall 12 of the casing 10 so as to form an annular space 46 therebetween. The rings 45 correspond in number to the deflectors and are spaced vertically apart by means of washer-shaped elements 47 in order to form comparatively narrow openings 48 for permitting the liquid which is separated from the gas to pass outwardly from the shell into the annular space 46 at the upper end of the casing. The washer-shaped elements 47 are positioned between the deflectors 11 and have central apertures 49 of comparatively large diameter for permitting upward flow of the gas in the shell. The top faces of the elements extend downwardly and outwardly from the apertures 49 at an inclination corresponding to that of the bottom edges of the blades of the deflectors and serve to guide the liquid to the openings 48. The under faces of the elements 47 extend upwardly and outwardly from the apertures 49 at an inclination corresponding to that of the upper edges of the blades of the deflector and serve to guide any liquid which is thrown upwardly and outwardly by the blades to the openings 48 between the shell-forming rings 45. Radially extending ribs 50 are formed on the bottom and top faces of the washer-shaped elements and have the outer ends thereof cut away or notched to receive the edges of the rings 45. These ribs serve as the spacing means for the rings and serve to locate the elements 47 centrally with respect to the shell 44. The top face of the head 28 extends downwardly and outwardly so as to form a deflecting surface for the blades of the bottom deflector and has radially extending ribs 51 which are cut away or notched at the outer ends thereof and receive the lower edge of the lowermost, shell-forming ring 45. The rings 45 are built up on the hollow head 28 and the uppermost ring fits within an annular groove 52 in the bottom face of the top plate 13. The nut 38 at the lower end of the shaft 33 operates, when tightened, to exert clamping pressure upon the head 28 and to jamb or clamp the shell-forming rings and the washer-shaped elements 47 into locked relation.

The liquid which is separated from the gas by the blades 31 on the deflectors 11 and is thrown outwardly into the annular space 46 via the narrow openings 48 between the shell-forming rings 45 drops downwardly into the bottom portion of the casing 10 which serves as a reservoir or tank. A pipe 53 which is connected to and leads downwardly from the bottom plate 14 permits the accumulated liquid in the bottom of the casing to be drained away. This pipe, as shown in Figure 1 of the drawings is provided with a valve 54 whereby it may be closed or opened. In order that the amount of liquid in the casing bottom may be ascertained from the outside of the casing, a gauge 55 is provided. This gauge consists of a vertically extending, transparent tube 56 the upper and lower ends of which communicate with the interior of the casing by way of valve-controlled, pipe sections 57.

The device is assembled by welding the rings 16 and 21 to the ends of the cylindrical side wall 12 of the casing and then mounting the various parts, such as the gauge 55 and the bottom plate 14, in place. The top plate 13, after assembly of the deflectors on the shaft 33 and mounting in place of the shell-forming rings 45 and the washer-shaped elements 47, is placed over the ring 16 and is dropped downwardly so as to bring the studs 15 through the holes 17. During lowering of the top plate, the extension 27 on the lower end of the hollow head 28 slides into engagement with the upwardly extending inner end of the inlet nipple 26.

The operation of the device is as follows:

When gas under pressure is permitted to flow to the inlet nipple 26, it flows upwardly into the hollow head 28 and then passes through the shell to the outlet nipple 29. As the gas flows upwardly through the shell, it strikes or impinges against the blades 31 of the deflectors and causes the deflectors to rotate. As a result of rotation of the deflectors, any liquid in suspension in the gas is thrown outwardly as the result of centrifugal force and is guided through the narrow openings 48 by the washer-shaped elements 47. After being discharged or thrown through the openings 48, the liquid drops to the bottom of the casing where it remains until the casing is emptied by opening of the valve 54.

The herein described separating device is extremely efficient in operation and because of the fact that it embodies but a small number of parts may be manufactured at a low and reasonable cost. It is in the nature of a unitary structure and may be used effectively between the compressor and the condenser of a refrigerating system to remove any oil or water in the refrigerant prior to passage of the refrigerant to the evaporating coil, or it may be used in the outlet pipe for an oil lubricated, centrifugal compressor for removing oil from the compressed fluid.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a device for separating liquid in suspension from gas, the combination of an elongated, vertical extending casing, a tubular, vertically extending shell disposed in the casing in spaced relation with respect to the side wall thereof and provided with circumferential side openings, means associated with the casing for directing the gas vertically through the shell, a deflector mounted in the shell for rotation on a vertical axis and having radially extending blades whereby it is caused to rotate in response to passage of the gas through the shell and the liquid in suspension is caused by centrifugal force to be thrown outwardly, and a washer-shaped element disposed wholly within the shell and so that it underlies the blades of the deflector and having an outwardly and downwardly inclined top face for directing the liquid thrown outwardly by the deflector through the side openings in the shell and into the space between the shell and the side wall of the casing.

2. In a device for separating liquid in suspension from gas, the combination of an elongated, vertically extending casing, a tubular, vertically extending shell disposed in the casing in spaced relation with respect to the side wall thereof and provided with side openings, means associated with the casing for directing the gas vertically through the shell, a deflector mounted in the shell for rotation on a vertical axis and having radially extending blades whereby it is caused to rotate in response to passage of the gas through the shell and the liquid in suspension is caused by centrifugal force to be thrown outwardly, and washer-shaped elements above and below the blades of the deflector having opposed inclined faces for directing the liquid thrown outwardly by the deflector through the side openings in the shell and into the space between the shell and the side wall of the casing.

3. In a device for separating liquid in suspension from gas, the combination of an elongated, vertically extending casing, a tubular, vertically extending shell disposed in the casing in spaced relation with respect to the side wall thereof and provided with side openings, means associated with the casing for directing the gas longitudinally through the shell, a plurality of deflectors mounted in the shell for rotation on a vertical axis and having radially extending, angularly shaped blades whereby they are caused to rotate in response to passage of the gas through the shell and the liquid in suspension is caused by centrifugal force to be thrown outwardly, and outwardly tapered, washer-shaped elements disposed wholly within the shell and between the deflectors and arranged to direct the liquid thrown outwardly through the side openings in the shell and into the space between the shell and the side wall of the casing.

4. In a device for separating liquid in suspension from gas, the combination of a casing, a tubular shell disposed in the casing in spaced relation with respect to the side wall thereof and consisting of a plurality of coaxial rings, means associated with the casing for directing the gas through the shell, a series of deflectors mounted in the shell for rotation transversely thereof and having radially extending, angularly disposed blades whereby they are caused to rotate in response to passage of the gas through the shell and the liquid in suspenison is caused by centrifugal force to be thrown outwardly, means between the deflectors and inwardly of the shell-forming rings for spacing the latter small distances apart to form side openings whereby the liquid thrown outwardly by the deflectors is permitted to pass into the space between the shell and the side wall of the casing and clamping means applied to the end rings for holding the rings in assembled and unit relation.

5. In a device for separating liquid in suspension from gas, the combination of a casing, a tubular shell disposed in the casing in spaced relation with respect to the side wall thereof and consisting of a plurality of coaxial rings, means associated with the casing for directing the gas through the shell, a series of deflectors mounted in the shell for rotation transversely thereof and having radially extending, angularly disposed blades whereby they are caused to rotate in response to passage of the gas through the shell and the liquid in suspension is caused by centrifugal force to be thrown outwardly, and washer-shaped elements between the deflectors and constructed to space the shell-forming rings small distances apart to form discharge openings for the liquid thrown outwardly by the deflectors and to guide such liquid through the openings.

6. In a device for separating liquid in suspension from gas, the combination of an elongated, vertically extending casing provided with a removable closure member at its upper end, means for directing the gas upwardly through the casing including an inlet nipple in the bottom portion of the casing and an outlet nipple on the closure member, a hollow head mounted slidably on and communicating with the inner inlet end of the inner nipple, a vertical shaft extending between and connected to the central portions of the closure member and said head and adapted together with said head to be withdrawn from the upper end of the casing upon removal of the closure member, and a plurality of horizontally extending deflectors mounted rotatably on the shaft and having radially extending blades whereby they are caused to rotate in response to passage of the gas through the casing and the liquid in suspension is caused to be thrown outwardly and separated from the gas by centrifugal force.

7. In a device for separating liquid in suspension from gas, the combination of an elongated, vertically extending casing provided with a removable closure member at its upper end an inlet nipple extending through the side wall of the casing and provided with an upwardly extending inner end, an outlet nipple in said closure member and serving with the inlet nipple to permit upward flow of the gas through the casing, a hollow head disposed in the casing and mounted on and communicating with the inner end of the inlet nipple, a tubular, vertically extending shell of reduced width positioned in the casing in clamped relation between the hollow head and said closure member and spaced from the side wall of the casing and having side openings therein, a vertical shaft extending through the shell and having the upper end thereof connected to the closure member and its lower end attached to the head so as to support the latter together with the shell, and horizontally extending deflectors mounted rotatably on the shaft and having radially extending blades whereby they are adapted to rotate in response to passage of the gas through the casing and the liquid in suspension is caused to be thrown outwardly and separated from the gas by centrifugal force.

8. In a device for separating liquid in suspension from gas, the combination of an elongated, vertically extending casing, provided with removable closure members at the ends thereof, means for directing the gas longitudinally through the casing consisting of an inlet nipple extending through the side wall of the casing and provided with an upwardly extending inner end and an outlet nipple formed as a part of the upper closure member, a hollow head disposed in the casing and mounted slidably on and communicating with the inner end of the inlet nipple, a tubular vertically extending shell of reduced width positioned in the casing between the hollow head and said upper closure member, and so that it is spaced from the side wall of the casing and having side openings therein, a vertical shaft in the shell extending between and connecting together said upper closure member and the hollow head and serving to hold said member and head in clamped relation against the shell and to remove as a unit the shell and head upon removal of the upper closure member from the casing, and a horizontally extending deflector mounted rotatably on the shaft and having radially extending blades whereby it is adapted to rotate in response to passage of the gas through the casing and the liquid in suspension is caused to be thrown outwardly through the side openings in the shell and thus separated from the gas by centrifugal force.

9. In a separator for removing impurities from gas, the combination of a casing, means inside said casing defining a passageway for gas, said passageway extending lengthwise through said casing and having a series of spaced annular chambers communicating therewith and spaced away from said casing, means for directing a flow of gas through said passageway from one end to the opposite end, a series of impellers mounted in said passageway at points opposite said chambers, respectively, and adapted to be rotated by the gas flow, each impeller having blades extending into and across the associated chamber and conforming to the dimensions thereof except for the necessary clearance to permit rotation, said blades being operative during rotation to transfer impurities from the gas stream to said chambers, and openings in the said chambers to permit the impurities to pass out into said casing.

10. In a separator for removing impurities from gases, a plurality of annular rings of wedge-shaped cross section, a plurality of bands assembled alternately with said rings and acting to space the same apart, said bands forming a shell surrounding said rings, and the latter forming a passageway for gas having a plurality of annular chambers communicating therewith, a shaft supported axially in said passageway, and a plurality of impellers corresponding to said chambers and rotating therein, each impeller having an inner portion in said passageway by means of which the impeller is rotated by the gas stream.

11. In a separator for removing impurities from gases, a plurality of annular rings each having inclined upper and lower faces converging toward the outside periphery, a plurality of ribs on each face, a plurality of bands assembled alternately with said rings and acting to space the same apart, said bands forming a shell surrounding said rings having openings between points where the bands engage said ribs, a shaft mounted axially within said rings, impellers mounted on said shaft at points between said rings, and means for directing a stream of gas through said rings to operate said impellers.

12. In a device for removing impurities from gases, a plurality of annular rings arranged in spaced relation on a common axis, each ring having alternate raised and recessed portions on each face, a shell surrounding said rings and having openings communicating with the spaces between rings, a shaft supported axially within said rings, impellers mounted on said shaft so that each impeller rotates between two rings, the impellers being so dimensioned that the ends thereof pass in close proximity to the inside of said shell and the sides thereof pass in close proximity to the raised portions on the faces of said rings, and means for directing a flow of gas through said rings to rotate said impellers.

13. In a device for separating impurities from gases, an impeller having a plurality of blades, each blade comprising an inner smooth surfaced driving section and an outer section having a broken surface, means for directing a stream of gas through said impeller and for confining the stream to engagement with the driving sections of said blades only, means cooperating with said first means to form an annular chamber closely fitted to the outer sections of said blades, said chamber having alternate portions of different elevation on the top and bottom and openings on the outside, the said impeller rotating responsive to the gas flow and acting to intercept impurities from the gas, accelerate intercepted impurities in a rotary movement, and cause the same to be transferred to said chamber by centrifugal force, whence they are guided outwardly through said openings partly by the broken surface of the outer sections of the impeller blades and partly by the raised portions on the top and bottom of said chamber.

14. In a device for separating impurities from gas, a plurality of impellers, means forming a passageway for directing gas through said impellers in succession, said passageway being of substantially smaller diameter than the diameter of the impellers, means cooperating with said first means to form an annular chamber closely surrounding each impeller into which impurities are transferred from the gas stream by the impeller and in which the gas is given a whirling motion, and an outer casing inclosing a dead space surrounding the said chambers into which the impurities are forced by the outward pressure of the whirling gas, said chambers having openings to permit the impurities to pass out as set forth.

15. In a device for removing impurities from a gas, a casing, an inner shell spaced away from the wall of said casing, a plurality of impellers mounted for rotation within said shell, said impellers having substantially the same diameter as the inner diameter of said shell, a plurality of annular rings inside the shell arranged alternately with the impellers, means for directing a gas stream through said rings, thereby rotating the impellers and passing impurities along the blades thereof into the spaces between said rings, said impellers setting up a whirling motion in the gas between the rings, a series of ribs on each ring face in close proximity to the adjacent impeller for outwardly deflecting impurities caught in the gas whirl, and openings in the shell through which the impurities are forced by the outward pressure of the gas whirl.

16. In a device for separating impurities from gases, a casing, a removable head for said casing having a central passageway for gas, a centrifugal separator means supporting said separator on said head inside said casing, whereby said separator is adapted to be removed from the casing with the head as a unit, said separator including a plurality of individually rotatable elements positioned at increasing distances, respectively, from the inner end of said passageway, means forming an integral part of said separator removable with said head and including a second passageway in alignment with the passageway in the head for directing a flow of gas through said elements, and a third passageway extending from the outside of the casing to the interior thereof arranged to automatically connect with the end of said second passageway when the said head and separator unit is inserted in the casing.

17. In a device for separating impurities from gases, a centrifugal separator comprising oppositely disposed end members each having a central opening therein, means including an outer casing for supporting one end member, a shaft coaxial with said openings for supporting the second end member on the first, each opening having a transverse web for attaching said shaft, a plurality of rotatable impellers mounted on said shaft between said end members, means including said shaft and webs for drawing the end members together, and spacing means for holding said end members a predetermined distance apart to take the strain when said end members are drawn together as set forth, thereby avoiding binding said impellers and providing for free rotation thereof on said shaft.

18. In a device for removing impurities from gases, a centrifugal separator comprising a shaft, a series of impellers mounted for rotation on said shaft, two oppositely disposed end members having ports for directing a flow of gas in an annular stream along the shaft and through said impellers, said impellers being adapted to rotate responsive to gas flow, intercept impurities from the gas, impart rotation to such impurities, and pass the same outwardly by centrifugal action, a separate individual ring or band surrounding each impeller and adapted to intercept impurities passed outwardly by the associated impeller, said bands being spaced apart sufficient to enable intercepted impurities to pass between them, a removable casing surrounding said separator in spaced relation to said bands and forming a reservoir for storing the separated impurities, and means for rigidly holding all the separator parts in fixed relation while said casing is being removed.

19. In a device for removing impurities from gases, a casing, a removable closure member for one end of said casing, a centrifugal separator within said casing and comprising end members of which one is said closure member, a cylindrical shell extending between said end members and comprising a plurality of spaced bands, a shaft axially mounted within said shell, a plurality of impellers rotatably mounted on said shaft, means including said shaft for supporting the separator parts including the shell, impellers, and inner end member on said removable closure member, whereby the said closure member and separator are removable from the casing as a unit, and a suitable passageway for gas including an opening in the closure member and an opening in the inner end member of the separator for directing a flow of gas through said impellers.

JULIUS F. KOPSA.